United States Patent [19]

Hashimoto

[11] 4,371,682
[45] Feb. 1, 1983

[54] ROOM TEMPERATURE CURABLE POLYORGANOSILOXANE COMPOSITION AND METHOD

[75] Inventor: Mitsuyoshi Hashimoto, Ojima, Japan

[73] Assignee: Toshiba Silicones, Ltd., Japan

[21] Appl. No.: 274,617

[22] Filed: Jun. 17, 1981

[30] Foreign Application Priority Data

Jun. 17, 1980 [JP] Japan .................................. 55-81999

[51] Int. Cl.³ ............................................... C08G 77/04
[52] U.S. Cl. ........................................ 528/34; 528/33; 528/901; 264/331.11
[58] Field of Search ...................... 528/901, 33, 34; 264/331.11

[56] References Cited

U.S. PATENT DOCUMENTS

| | | | |
|---|---|---|---|
| 3,471,434 | 10/1969 | Pande et al. | 528/34 |
| 3,697,568 | 10/1972 | Boissieras et al. | 528/34 |
| 3,796,686 | 3/1974 | Golitz et al. | 528/34 |
| 4,105,617 | 8/1978 | Clark et al. | 528/34 |

*Primary Examiner*—Melvyn I. Marquis

[57] ABSTRACT

There is provided a room temperature curable polyorganosiloxane composition comprised of (A) a silanol-terminated polydiorganosiloxane having a viscosity of 500 to 200,000 centistokes at 25° C. in combination with (B) an oxime radical-methoxyl radical exchange reaction product, and a catalyst for promoting the reaction of (A) and (B).

22 Claims, No Drawings

ROOM TEMPERATURE CURABLE POLYORGANOSILOXANE COMPOSITION AND METHOD

This application claims priority over Japanese application No. 81999/80 which was filed June 17, 1980.

BACKGROUND OF THE INVENTION

The present invention relates to a room temperature curing polyorganosiloxane composition which can be stored stably in the absence of moisture for a long period of time without curing but which is cured by moisture to form an elastomer when it is allowed to stand in air. Particularly, the present invention relates to a room temperature curing polyorganosiloxane composition having improved curing properties which releases an oxime compound upon curing.

Room temperature curing polyorganosiloxane compositions are well known and the constituents of which are generally kept in a closed vessle but the composition will cure by exposure to moisture in the air thereby releasing an oxime compound. Such a composition does not have an irritating smell due to the released substance and does not corrode metals substantially, nor will it affect alkaline substances such as mortar as compared with other polyorganosiloxane compositions which generate acetic acid upon curing into an elastomer. Therefore, the former materials have been used widely as sealing materials, adhesives, and coating materials in the construction, electric, electronic, automotive industries, etc. However, as compared with the acetic acid-releasing compositions, the oxime compound-releasing compositions have a lower curing velocity and relatively longer times are required for forming rubbery films on surfaces. Thus, the oxime compound-releasing compositions which require longer times for working and treatment are less satisfactory, and it has long been an object to overcome such defects.

Among processes for increasing the curing velocity or cure rate of these polyorganosiloxane compositions which release an oxime compound upon curing to form an elastomer, there has been proposed a process in the specification of Japanese Patent Laid-Open No. 116424/1977 wherein an oxime radical-containing silane is used as a cross-linking agent wherein at least one of the organic radicals bonded with a silicon atom via a silicon-carbon bond is substituted with a monocarboxylic acid residue in which the hydrocarbon radical may be unsubstituted or substituted with a halogen atom, a nitro radical, an alkoxyl radical or a cyano radical. However, in practice, this silane compound has disadvantages in that special materials are required for the synthesis thereof and the synthesis is difficult. Under these circumstances, the development of a cross-linking agent which can be synthesized more easily and which can increase the curing velocity and which also can be used for the production of a room temperature curing polyorganosiloxane composition of the oxime compound-releasing type has been sought.

The present invention relates to an improvement in curing velocity for polyorganosiloxane compositions which release an oxime compound upon curing. An object of the invention is therefore to provide a composition which forms a rubbery, cured film on a surface in a short period of time upon contact with moisture in the air.

SUMMARY OF THE INVENTION

The present invention relates to a room temperature curing polyorganosiloxane composition and method of making the same comprising:

(A) 100 parts by weight of silanol-terminated polyorganosiloxane having a viscosity of 500 to 200,000 centistokes at 25° C.;

(B) 0.5 to 25 parts by weight of an oxime radical-methoxyl radical exchange reaction product obtaind from:
(1) an oxime radical-containing organosilicon compound selected from the group consisting of oxime radical-containing silanes of the general formula:

wherein R$^1$ represents a substituted or unsubstituted monovalent hydrocarbon radical, =Q represents a bivalent radical of the formula:

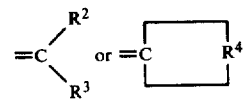

R$^2$ and R$^3$ respectively represent a monovalent radical selected from the group consisting of hydrogen atoms and substituted or unsubstituted monovalent hydrocarbon radicals, R$^4$ represents an alkylene radical of 4 to 6 carbon atoms, a represents a number of 0 to 1, and partially hydrolyzed condensates thereof, and (2) a methoxyl radical-containing organosilicon compound selected from the group consisting of methoxyl radical-containing silanes of the general formula:

wherein R$^5$ represents a substituted or unsubstituted monovalent hydrocarbon radical, b represents a number of 0 or 1, and partially hydrolyzed condensates thereof in such amounts that a molar ratio of the oxime radical bonded with the silicon atom in (1) to the methoxyl radical bonded with the silicon atom will be 1:(0.2 to 2.0), and (C) 0.01 to 10 parts by weight of a catalyst for promoting the reaction of (A) and (B).

DESCRIPTION OF THE INVENTION

Component (A) used in the present invention is a silanol-terminated polydiorganosiloxane usually contained in room temperature curing polysiloxane compositions of the condensation type. Component (A) must have a viscosity at 25° C. of 500 to 200,000 centistokes in order to impart suitable extrusion properties to the uncured composition as well as excellent mechanical properties to the cured elastomer. If the viscosity is less than 500 centistokes, elongation of the cured elastomer is insufficient, but on the other hand, if the viscosity is greater than 200,000 centistokes, a homogeneous composition cannot be obtained and extrusion workability is reduced. A particularly preferred viscosity of component (A) for obtaining well-balanced properties of the composition before and after the curing is in the range of 3,000 to 150,000 centistokes. Organic radicals directly bonded with the silicon atom may include alkyl radicals such as methyl, ethyl, propyl, butyl and hexyl radicals, alkenyl radicals such as vinyl and allyl radicals, aryl radicals such as phenyl radicals, aralkyl radicals such as beta-phenylethyl radicals, and substituted monovalent hydrocarbon radicals such as 3,3,3-trifluoropropyl, chloromethyl and 3-cyanoethyl radicals. From the viewpoint of ease of synthesis, monovalent hydrocarbon radicals such as methyl, vinyl and phenyl radicals are generally advantageous. The other organic radicals are recommended only when specific properties such as oil resistance and paintability are to be imparted to the cured elastomer. Among them, methyl radicals are particularly preferred, since a starting intermediate thereof is obtained most easily, it has the lowest viscosity for siloxanes at a fixed polymerization degree and it realizes an excellent balance between extrusion workability of the uncured composition and physical properties of the cured elastomer. Therefore, it is preferred that at least 85% of the total organic radicals be methyl radicals. It is particularly preferred that the organic radicals are substantially methyl radicals. When cold resistance or heat resistance is required of the cured elastomer, it is recommended that some of the organic radicals be phenyl radicals.

Component (B) used in the present invention is a cross-linking agent which cures the composition by reacting with the silanol radical of silanol-terminated polydiorganosiloxane (A) to form a reticulate structure. Component (B) is an exchange reaction product of oxime radicals and methoxyl radicals bonded to silicon atoms in (1) and (2) which will be described below. Component (B) will form a rubbery, cured film on a surface in a relatively short period of time.

Oxime radical-containing organosilicon compound (1) is an oxime radical-containing silane of the general formula:

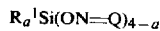

wherein $R^1$, Q and a have the same meanings as above. Compound (1) may also be a partially hydrolyzed condensate of the oxime radical-containing silane. Compound (1) can be obtained easily by known processes, for example, by reacting a corresponding organochlorosilane with an oxime compound in the presence of a hydrogen chloride acceptor. As radical $R^1$, there may be included alkyl radicals such as methyl, ethyl, propyl, hexyl and octyl radicals, alkenyl radicals such as vinyl and allyl radicals, aryl radicals such as phenyl radicals and substituted monovalent hydrocarbon radicals such as 3,3,3-trifluoropropyl, chloromethyl and beta-cyanoethyl radicals. From the viewpoint of ease of synthesis or handling, alkyl radicals of 1 to 8 carbon atoms, alkenyl radicals of 2 to 3 carbon atoms and phenyl radical are preferred. Particularly, methyl radicals are preferred. Q is a bivalent radical represented by the formula:

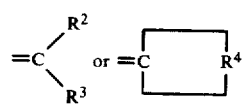

in which $R^2$, $R^3$ and $R^4$ have the same meanings as above. Radicals $R^2$ and $R^3$ which may be the same as or different from each other represent hydrogen atoms or an alkyl radical such as methyl, ethyl, propyl or butyl radicals or an alkenyl radical such as allyl or butenyl radicals. Radical $R^4$ may include, for example, butylene, pentylene, hexylene, 1-methylbutylene and 2-methylpentylene radicals. Among them, preferred are methyl and ethyl radicals for $R^2$ and $R^3$ which may be the same as or different from each other, and $R^4$ is preferably a pentylene radical, from the viewpoint of availability of the starting materials. It is particularly preferred that $R^2$ and $R^3$ independently represent methyl radicals or ethyl radicals, since the starting materials and by-products are in liquid form and can be easily handled and have satisfactory reactivity. As examples of the oxime radical-containing organosilicon compounds, there may be mentioned tetrakis(acetoneoxime)-silane, tetrakis(butanoneoxime)silane, methyltris(acetoneoxime)silane, methyltris(butanoneoxime)silane, methyltris-(cyclohexanoneoxime)silane, vinyltris(acetoneoxime)silane, vinyltris(butanoneoxime)silane and partially hydrolyzed condensates of these.

Methoxyl radical-containing organosilicon compound (2) is a methoxyl radical-containing silane of the general formula:

wherein $R^5$ and b have the same meanings as above, or a partially hydrolyzed condensate thereof. Compound (2) can be obtained by, for example, reacting a corresponding organochlorosilane with methanol. Radical $R^5$ may include alkyl radicals such as methyl radicals, ethyl radicals, propyl radicals, butyl radicals, hexyl radicals and octyl radicals, alkenyl radicals such as vinyl radicals and allyl radicals, aryl radicals such as phenyl radicals, and substituted monovalent hydrocarbon radicals such as beta-(3,4-epoxycyclohexyl)ethyl radicals, gamma-glycidoxypropyl radicals, gamma-chloropropyl radicals, 3,3,3-trifluoropropyl radicals, gamma-methacryloxypropyl radicals, gamma-mercaptopropyl radicals, gamma-ureidopropyl radicals and beta-cyanoethyl radicals. From the viewpoint of ease of synthesis and handling alkyl radicals of 1 to 8 carbon atoms, alkenyl radicals of 2 to 3 carbon atoms and phenyl radicals are preferred.

The amount of (2) is selected such that the molar ratio of the oxime radical bonded with the silicon atom in (1) to the methoxyl radical bonded with the silicon atom in (2) is 1:(0.2–2.0), preferably 1:(0.5–1.5). If the amount of methoxyl radical is less than 0.2 mole per mole of the oxime radical, it is impossible to obtain a composition having a sufficiently high curing velocity and which will also form a rubbery film on a surface in a short period of time. If the amount of methoxyl radical is more than 2 moles per mole of the oxime radical, storage stability of the composition is seriously degraded.

The exchange reaction between the oxime radical bonded with silicon atom in (1) with the methoxyl radical bonded with silicon atom in (2) proceeds by mixing (1) and (2) even at ambient temperature. It is particularly preferred, however, to accelerate the reaction by heating. The reaction can be promoted in the presence of a small, catalytic amount of an amine, an organic acid or a metal salt of carboxylic acid. For preventing the discoloration of (B), it is preferred to carry out the reaction in the absence of any catalyst or an amine. Further, for obtaining the composition intended by the present invention which has a high curing velocity and which forms a rubbery film on the surface within a short period of time, it is preferred to allow the exchange reaction to proceed until the equilibrium condition is attained.

The amount of component (B) is in the range of 0.5-25 parts by weight, preferably, 3-10 parts by weight. If the amount is less than 0.5 part by weight, the resulting composition has a poor storage stability. On the other hand, if the amount is more than 25 parts by weight, the cured elastomer has poor physical properties.

Component (C) used in the present invention is the catalyst which accelerates the reaction of (A) with (B). As component (C), there may be included, for example, organotin carboxylates such as dibutyltin diacetate, dibutyltin dioctoate, dibutyltin dilaurate, dibutyltin maleate and dioctyltin dilaurate, other organotin compounds such as dibutyltin oxide, metal carboxylates such as iron octanoate, zinc octanoate, lead octanoate, cobalt naphthenate, zinc octanoate, lead octanoate, cobalt naphthenate, zinc stearate and cobalt oleate, organic titanic esters such as tetrapropyl titanate, tetrabutyl titanate and triethanolamine titanate, organic amines such as hexylamine and benzylamine, and ammonium salts thereof. Among them, the organotin carboxylates are preferred, since they exhibit an excellent cure-accelerating effect in the presence of moisture.

The amount of component (C) is in the range of 0.01 to 10 parts by weight, preferably 0.1 to 2.0 parts by weight. If the amount is less than 0.01 part by weight, it is impossible to obtain a composition having a high curing velocity and capable of forming a rubbery film on the surface in a short period of time. If the amount is more than 10 parts by weight, viscosity increase in the preparation of the composition is marked, and storage stability and mechanical properties of the cured elastomer are degraded.

Generally, an inorganic filler is incorporated in the composition of the present invention comprising above components (A) to (C) for the purpose of imparting a suitable fluidity and extruding property to the uncured composition and also imparting mechanical strength and hardness to the cured elastomer. As the inorganic fillers, there may be used those which have been known in the art such as fumed silica, precipitated silica, silica aerogel, pulverized silica, diatomaceous earth, iron oxide, titanium oxide and calcium carbonate. These inorganic fillers may be used either alone or in the form of a mixture of two or more of them. They may be used as is, or after the surface treatment with an organosilicon compound such as polydimethylsiloxane, octamethylcyclotetrasiloxane and hexamethyldisilazane.

Further, the composition of the present invention may have various additives such as a pigment, solvent, thixotropic agent, adhesion promotor, viscosity modifier for improving extrusion workability, anti-mildew agent, ultraviolet ray absorbor, heat resistance-improving agent and flame retardant.

The composition of the present invention can be used in the form of a one package room temperature curing polysiloxane composition which is produced by mixing all of the above described components and, if necessary, an inorganic filler and various additives in the absence of moisture, and which is stored in a closed vessel and cured by exposing the composition to the moisture in the air at the time of use. The composition may be used also in the form of a two package room temperature curing polysiloxane composition. In the latter case, at least one of components (A), (B) or (C) is stored in another vessel, and the contents of both vessels are mixed at the time of use.

According to the present invention, it is easily possible to form a rubbery film of the room temperature curing oxime-releasing polyorganosiloxane having a high curing velocity in a short period of time by contacting the same with moisture in the air. Accordingly, the working and treatment can be performed rapidly and in an economical manner. The composition of the present invention is useful as a sealant and coating material for building construction and also as an adhesive and sealant in electric and electronic industries as well as in other fields.

The following examples further illustrate the present invention. In the following examples parts are given by weight. For simplification, the following symbols are employed:

| Me: Methyl radical, | Et: Ethyl radical |
|---|---|
| Pr: Propyl radical, | Vi: Vinyl radical |
| Ph: Phenyl radical; | |

EXAMPLE 1

180 Parts of MeSi(ON=CMeEt)$_3$ and 22 parts of ViSi(OMe)$_3$ were charged in a reactor and the mixture was heated to 70° C. under stirring for 10 hours in dry nitrogen atmosphere to prompt the exchange reaction, thereby obtaining silane mixture S-1. S-1 was a colorless, transparent liquid. The results of gas chromatographic analysis were as shown below:.

| MeSi(OMe)$_2$(ON=CMeEt) | 5.1 wt. % |
|---|---|
| ViSi(OMe)$_2$(ON=CMeEt) | 2.0 wt. % |
| MeSi(OMe)(ON=CMeEt)$_2$ | 38.6 wt. % |
| ViSi(OMe)(ON—CMeEt)$_2$ | 12.3 wt. % |
| MeSi(ON=CMeEt)$_3$ | 40.6 wt. % |

EXAMPLE 2 (COMPARATIVE EXAMPLE)

180 Parts of MeSi(ON=CMeEt)$_3$ and 26.6 parts of ViSi(OEt)$_3$ were charged in a reactor and the mixture was heated to 80° C. under stirring for 12 hours in dry nitrogen atmosphere to prompt the exchange reaction, thereby obtaining silane mixture S-2. S-2 was a colorless, transparent liquid. The results of gas chromatographic analysis were as shown below:

| MeSi(OEt)$_2$(ON=CMeEt) | 5.0 wt. % |
|---|---|
| ViSi(OEt)$_2$(ON=CMeEt) | 10 wt. % |
| MeSi(OEt)(ON=CMeEt)$_2$ | 40.4 wt. % |
| ViSi(OEt)(ON=CMeEt)$_2$ | 13.2 wt. % |
| MeSi(ON=CMeEt)$_3$ | 40.3 wt. % |

EXAMPLE 3

205 Parts of PhSi(ON=CMeEt)$_3$ and 32.6 parts of ViSi(OMe)$_3$ were charged in a reactor and the mixture was heated to 80° C. under stirring for 12 hours in dry nitrogen atmosphere to prompt the exchange reaction, thereby obtaining a silane mixture S-3. S-3 was a light yellow, transparent liquid. The results of gas chromatographic analysis were as shown below:

| PhSi(OMe)$_2$(ON=CMeEt) | 9.6 wt. % |
|---|---|

| -continued | |
|---|---|
| ViSi(OMe)2(ON=CMeEt) | 4.3 wt. % |
| PhSi(OMe)(ON=CMeEt)2 | 46.4 wt. % |
| ViSi(OMe)(ON=CMeEt)2 | 16.0 wt. % |
| PhSi(ON=CMeEt)3 | 20.2 wt. % |

EXAMPLE 4 (COMPARATIVE EXAMPLE)

205 Parts of PhSi(ON=CMeEt)3 and 41.8 parts of ViSi(OEt)3 were charged in a reactor and the mixture was heated to 90° C. under stirring for 8 hours in dry nitrogen atmosphere to prompt the exchange reaction, thereby obtaining silane mixture S-4. S-4 was a light yellow, transparent liquid. The results of gas chromatographic analysis were as shown below:

| PhSi(OEt)2(ON=CMeEt) | 8.2 wt. % |
|---|---|
| ViSi(OEt)2(ON=CMeEt) | 1.2 wt. % |
| PhSi(OEt)(ON=CMeEt)2 | 48.2 wt. % |
| ViSi(OEt)(ON=CMeEt)2 | 17.6 wt. % |
| PhSi(ON=CMeEt)3 | 22.4 wt. % |

EXAMPLE 5

259 Parts of MeSi(ON=CMe2)3 and 38 parts of Si(OMe)4 were charged in a reactor and the mixture was heated to 70° C. under stirring for 6 hours in dry nitrogen atmosphere to prompt the exchange reaction, thereby obtaining silane mixture S-5. S-5 was a colorless, transparent liquid. The results of gas chromatographic analysis were as shown below:

| MeSi(OMe)2(ON=CMe2) | 8.6 wt. % |
|---|---|
| Si(OMe)3(ON=CMe2) | 3.2 wt. % |
| MeSi(OMe)(ON=CMe2)2 | 54.6 wt. % |
| Si(OMe)2(ON=CMe2)2 | 18.6 wt. % |
| MeSi(ON=CMe2)3 | 13.2 wt. % |

EXAMPLE 6 (COMPARATIVE EXAMPLE)

259 Parts of MeSi(ON=CMe2)3 and 66 parts of Si(OPr)4 were charged in a reactor and the mixture was heated to 80° C. under stirring for 10 hours in dry nitrogen atmosphere to prompt the exchange reaction, thereby obtaining silane mixture S-6. S-6 was a colorless, transparent liquid. The results of gas chromatographic analysis were as shown below:

| MeSi(OPr)2(ON=CMe2) | 10.6 wt. % |
|---|---|
| Si(OPr)3(ON=CMe2) | 4.6 wt. % |
| MeSi(OPr)(ON=CMe2)2 | 48.6 wt. % |
| Si(OPr)2(ON=CMe2)2 | 17.4 wt. % |
| MeSi(ON=CMe2)3 | 17.4 wt. % |

EXAMPLE 7

212 Parts of

MeSi(ON=C6H10)3 and 50 parts of Cl(CH2)3Si(OMe)3 were charged in a reactor and the mixture was heated to 80° C. under stirring for 10 hours in dry nitrogen atmosphere to prompt the exchange reaction, thereby obtaining silane mixture S-7. S-7 was a light yellow, transparent, viscous liquid. The results of gas chromatographic analysis were as shown below:

| | |
|---|---|
| MeSi(OMe)2(ON=C6H10) | 8.4 wt. % |
| Cl(CH2)3Si(OMe)2(ON=C6H10) | 2.3 wt. % |
| MeSi(OMe)(ON=C6H10)2 | 46.3 wt. % |
| Cl(CH2)3Si(ON=C6H10)2 | 14.3 wt. % |
| MeSi(ON=C6H10) | 27.6 wt. % |

EXAMPLE 8

100 Parts of a silanol-terminated polydimethylsiloxane having a viscosity of 10,000 centistokes at 25° C. were kneaded together with 12 parts of fumed silica having a specific surface area of about 200 m²/g which had been surface-treated with polydimethylsiloxane to obtain homogeneous base compound A. Then, base compound A was incorporated with a cross-linking agent and a catalyst as shown in Table 1 in dry nitrogen stream and the whole was further kneaded in a closed mixer for 10 minutes to obtain homogeneous compositions 11 to 14. Among them, compositions 12 to 14 are comparative compositions.

Each of those compositions immediately after the kneading was charged in a cartridge and extruded into the open air. The time required to obtain a tack-free condition was determined according to the specification of JIS A 5758. The results are shown in Table 1.

TABLE 1

| | Composition No. | | | |
|---|---|---|---|---|
| Components | 11 | 12 | 13 | 14 |
| Base Compound A | 112 | 112 | 112 | 112 |
| S-1 | 6.0 | — | — | — |
| MeSi(ON=CMeEt)3 | — | 5.3 | 5.3 | — |
| ViSi(OMe)3 | — | — | 0.7 | — |
| S-2 | — | — | — | 6.1 |
| Dibutyltin Dilaurate | 0.2 | 0.2 | 0.2 | 0.2 |
| Tack-free time (min.) | 15 | 45 | 40 | 50 |

EXAMPLE 9

100 Parts of a silanol-terminated polydimethylsiloxane having a viscosity of 6,000 centistokes at 25° C. were kneaded together with 12 parts of fumed silica having a specific surface area of about 200 m²/g to obtain homogeneous base compound B. Then, base compound B was incorporated with a cross-linking agent, catalyst and adhesion promoter as shown in Table 2 in a dry nitrogen stream and the whole was further kneaded in a closed stirring-type mixer for 10 minutes to obtain homogeneous compositions 21 to 24.

The time required to obtain a tack-free condition for each of the compositions were determined in the same manner as in Example 8 immediately after the kneading. The results are shown in Table 2. Compositions 22 to 24 are comparative compositions.

TABLE 2

| Components | Composition No. | | | |
|---|---|---|---|---|
| | 21 | 22 | 23 | 24 |
| Base Compound B | 112 | 112 | 112 | 112 |
| S-3 | 7.0 | — | — | — |
| PhSi(ON=CMeEt)$_3$ | — | 6.0 | 6.0 | — |
| ViSi(OMe)$_3$ | — | — | 1.0 | — |
| S-4 | — | — | — | 7.2 |
| H$_2$N(CH$_2$)$_2$NH(CH$_2$)$_3$—Si(OMe)$_3$ | 1.5 | 1.5 | 1.5 | 1.5 |
| Dibutyltin Dilaurate | 0.2 | 0.2 | 0.2 | 0.2 |
| Tack-free time (min.) | 6 | 20 | 18 | 25 |

EXAMPLE 10

100 Parts of a silanol-terminated polydimethylsiloxane having a viscosity of 10,000 centistokes at 25° C. were kneaded together with 20 parts of trimethylsiloxy-terminated polydimethylsiloxane having a viscosity of 100 centistokes at 25° C., 8 parts of fumed silica having a specific surface area of 150 m$^2$/g and 40 parts of red iron oxide to obtain homogeneous base compound C. Then, base compound C was incorporated with a crosslinking agent, catalyst and adhesion promoter as shown in Table 3 in a dry nitrogen stream. The whole was further kneaded in a closed stirring-type mixer for 15 minutes to obtain homogeneous compositions 31 to 34. Among them, compositions 32 to 34 are comparative compositions. The time required to obtain a tack-free condition of each composition was determined in the same manner as in Example 8 immediately after kneading. The results are shown in Table 3.

TABLE 3

| Components | Composition No. | | | |
|---|---|---|---|---|
| | 31 | 32 | 33 | 34 |
| Base Compound C | 168 | 168 | 168 | 168 |
| S-5 | 7.0 | — | — | — |
| MeSi(ON=CMe$_2$)$_3$ | — | 6.1 | 6.1 | — |
| Si(OMe)$_4$ | — | — | 0.9 | — |
| S-6 | — | — | — | 7.6 |
| H$_2$N(CH$_2$)$_3$Si(OEt)$_3$ | 3.0 | 3.0 | 3.0 | 3.0 |
| Dioctyltin Dilaurate | 0.2 | 0.2 | 0.2 | 0.2 |
| Tack-free time (min.) | 12 | 25 | 20 | 35 |

EXAMPLE 11

100 Parts of a silanol-terminated polydiorganosiloxane comprising 15 molar % of diphenylsiloxy units and the remainder being dimethylsiloxy units and having a viscosity of 10,000 centistokes at 25° C. were kneaded together with 25 parts of a timethylsiloxy-terminated polydiorganosiloxane comprising 8 molar % of diphenylsiloxy units and the remainder being dimethylsiloxy units and having a viscosity of 100 centistokes at 25° C., 8 parts of fumed silica having a specific surface area of 200 m$^2$/g the surface and which had been treated with polydimethylsiloxane and 60 parts of calcium carbonate. The mixture was kneaded under heating to 120° C. under reduced pressure for 6 hours while dehydration was utilized to obtain base compound D. Then, base compound D was incorporated with a crosslinking agent and catalyst as shown in Table 4 in a dry nitrogen stream. The whole was further kneaded in a closed stirring-type mixer for 10 minutes to obtain homogeneous compositions 41 to 43. Among them, compositions 42 to 43 are comparative compositions. The time required for obtaining a tack-free condition for each of the compositions was determined in the same manner as in Example 8 immediately after the kneading. The results are shown in Table 4.

TABLE 4

| Components | Composition No | | |
|---|---|---|---|
| | 41 | 42 | 43 |
| Base Compound D | 193 | 193 | 193 |
| S-7 | 8.0 | — | — |
|  | — | 6.5 | — |
| MeSi(ON 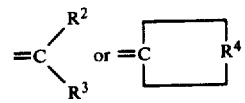 C$_6$H$_{10}$)$_3$ | | | |
| Cl(CH$_2$)$_3$Si(OMe)$_3$ | — | — | 1.5 |
| Tin Octanoate | 0.2 | 0.2 | 0.2 |
| Tack-free time (min.) | 15 | 60 | 50 |

What is claimed as new and desired to be secured by Letters Patent of the United States is:

1. A room temperature curing polyorganosiloxane composition comprising: (A) 100 parts by weight of a silanol-terminated polydiorganosiloxane having a viscosity of 500 to 200,000 centistokes at 25° C., (B) 0.5–25 parts by weight of an oxime radical-methoxyl radical exchange reaction product obtained from:

(1) an oxime radical-containing organosilicon compound selected from the group consisting of oxime radical-containing silanes of the general formula:

$$R_a^1Si(ON=Q)_{4-a}$$

wherein R$^1$ represents a substituted or unsubstituted monovalent hydrocarbon radical, =Q represents a bivalent radical of the formula:

R$^2$ and R$^3$ respectively represent a monovalent radical selected from the group consisting of hydrogen atoms and substituted or unsubstituted monovalent hydrocarbon radicals, R$^4$ represents an alkylene radical of 4 to 6 carbon atoms, and a represents a number of 0 or 1 and partially hydrolyzed condensates thereof, and (2) a methoxyl radical-containing organosilicon compound selected from the group consisting of methoxyl radical-containing silanes of the general formula:

$$R_b^5Si(OCH_3)_{4-b}$$

wherein R$^5$ represents a substituted or unsubstituted monovalent hydrocarbon radical, and b represents a number of 0 or 1 and partially hydrolyzed condensates thereof, in such amounts that a molar ratio of the oxime radical bonded with the silicon atom will be 1:(0.2–2.0); and (C) 0.01 to 10 parts by weight of a catalyst for promoting the reaction of (A) and (B).

2. A composition according to claim 1 which further contains an inorganic filler.

3. A composition according to claim 1 wherein the organic radical bonded with silicon atom in (A) is a monovalent hydrocarbon radial selected from the group consisting of methyl, vinyl and phenyl radicals.

4. A composition according to claim 3 wherein at least 85% of the organic radicals bonded with the silicon atom in (A) are methyl radicals.

5. A composition according to claim 3 wherein the organic radical bonded with the silicon atom in (A) is a methyl radical.

6. A composition according to claim 1 wherein $R^1$ is a monovalent hydrocarbon radical selected from the group consisting of alkyl radicals of 1 to 8 carbon atoms, alkenyl radicals of 2 to 3 carbon atoms and phenyl radicals.

7. A composition according to claim 6 wherein $R^1$ is a methyl radical.

8. A composition according to claim 1 wherein $=Q$ represents

$R^2$ and $R^3$ respectively represent an alkyl radical of 1 to 2 carbon atoms which may be the same as or different from each other.

9. A composition according to claim 1 wherein $R^5$ is a monovalent hydrocarbon radical selected from the group consisting of alkyl radicals of 1 to 8 carbon atoms, alkenyl radicals of 2 to 3 carbon atoms and phenyl radicals.

10. A composition according to claim 1 wherein (B) is a reaction product of (1) and (2) obtained upon heating.

11. A process for producing a room temperature curing polyorganosiloxane composition comprising the steps of combining: (A) 100 parts by weight of a silanol-terminated polydiorganosiloxane having a viscosity of 500-200,000 centistokes at 25° C., with (B) 0.5-25 parts by weight of an oxime radical-methoxyl radical exchange reaction product obtained by reacting:

(1) an oxime radical-containing organosilicon compound selected from the group consisting of oxime radical-containing silanes of the general formula:

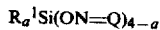

wherein $R^1$ represents a substituted or unsubstituted monovalent hydrocarbon radical, $=Q$ represents a bivalent radical of the formula:

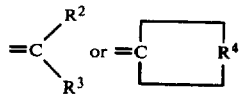

$R^2$ and $R^3$ respectively represent a monovalent radical selected from the group consisting of hydrogen atoms and substituted or unsubstituted monovalent hydrocarbon radicals, $R^4$ represents an alkylene radical of 4 to 6 carbon atoms, and a represents a number of 0 or 1 and partially hydrolyzed condensates thereof, and (2) a methoxyl radical-containing organosilicon compound selected from the group consisting of methoxyl radical-containing silanes of the general formula:

wherein $R^5$ represents a substituted or unsubstituted monovalent hydrocarbon radical, and b represents a number of 0 to 1 and partially hydrolyzed condensates thereof, in such amounts that a molar ratio of the oxime radical bonded with the silicon atom will be 1:(0.2-2.0); and (C) 0.01 to 10 parts by weight of a catalyst for promoting the reaction of (A) and (B).

12. A process as in claim 11 further comprising the step of adding an inorganic filler to said composition.

13. A process according to claim 11 wherein the organic radical bonded with silicon atom in (A) is a monovalent hydrocarbon radical selected from the group consisting of methyl, vinyl and phenyl radicals.

14. A process according to claim 13 wherein at least 85% of the organic radicals bonded with the silicon atoms in (A) are methyl radicals.

15. A process according to claim 13 wherein the organic radical bonded with the silicon atom in (A) is a methyl radical.

16. A process according to claim 11 wherein $R^1$ is a monovalent hydrocarbon radical selected from the group consisting of alkyl radicals of 1 to 8 carbon atoms, alkenyl radicals of 2 to 3 carbon atoms and phenyl radicals.

17. A process according to claim 16 wherein $R^1$ is a methyl radical.

18. A process according to claim 11 wherein $=Q$ represents

$R^2$ and $R^3$ respectively represent an alkyl radical of 1 to 2 carbon atoms which may be the same as or different from each other.

19. A process according to claim 11 wherein $R^5$ is a monovalent hydrocarbon radical selected from the group consisting of alkyl radicals of 1 to 8 carbon atoms, alkenyl radicals of 2 to 3 carbon atoms and phenyl radicals.

20. A process according to claim 11 wherein (B) is a reaction product of (1) and (2) obtained upon heating.

21. A process according to claim 11 further comprising the step of extruding said polyorganosiloxane composition.

22. A process according to claim 11 or 21 further comprising the step of curing said polyorganosiloxane composition upon exposure to moisture in air.

* * * * *